US 6,693,146 B2

(12) United States Patent
Mueller et al.

(10) Patent No.: US 6,693,146 B2
(45) Date of Patent: Feb. 17, 2004

(54) SELF-CROSSLINKING AQUEOUS POLYSTYRENE-BUTADIENE DISPERSIONS FOR CONSOLIDATING BITUMINIZABLE NONWOVENS AND ALSO CONSOLIDATED NONWOVENS

(75) Inventors: Gunther Mueller, Nottuin (DE); Helmut Daum, Seeheim-Jugenheim (DE); Willibald Scheda, Duelmen (DE)

(73) Assignee: Polymerlatex GmbH & Co. KG., Marl (DE)

( * ) Notice: Subject to any disclaimer, the term of this patent is extended or adjusted under 35 U.S.C. 154(b) by 0 days.

(21) Appl. No.: 10/334,830

(22) Filed: Jan. 2, 2003

(65) Prior Publication Data

US 2003/0100674 A1 May 29, 2003

Related U.S. Application Data

(62) Division of application No. 09/753,560, filed on Jan. 4, 2001.

(30) Foreign Application Priority Data

Jan. 7, 2000 (DE) .......................... 100 00 446

(51) Int. Cl.⁷ .............................. C08F 236/10
(52) U.S. Cl. ................... 524/526; 524/555; 524/552; 524/556; 524/575; 524/522; 524/577; 428/819
(58) Field of Search ................. 524/552, 555, 524/556, 575, 515, 522, 577, 526; 428/819

(56) References Cited

U.S. PATENT DOCUMENTS

| 4,358,403 A | | 11/1982 | Distler et al. | |
| 4,387,121 A | * | 6/1983 | Cautilli et al. | ............... 427/243 |
| 4,421,889 A | | 12/1983 | Braun et al. | |
| 5,244,964 A | * | 9/1993 | Hahn et al. | ............... 524/555 |
| 5,523,345 A | * | 6/1996 | Diehl et al. | ............... 524/548 |

FOREIGN PATENT DOCUMENTS

| DE | 26 28 760 A | | 5/1978 | |
| EP | 0 047 380 | | 3/1982 | |
| EP | 0 553 403 | | 8/1993 | |
| JP | 60-080857 A | | 5/1985 | |
| JP | 5-321197 A | | 12/1993 | |
| JP | 05321197 A | * | 12/1993 | .......... D21H/19/56 |
| WO | WO 97/25470 A1 | | 7/1997 | |
| WO | WO 9725470 A1 | * | 7/1997 | ............ D06N/3/10 |

OTHER PUBLICATIONS

Translation to JP 05321197 A.*

* cited by examiner

Primary Examiner—David W. Wu
Assistant Examiner—Satya Sastri
(74) Attorney, Agent, or Firm—Oblon, Spivak, McClelland, Maier & Neustadt, P.C.

(57) ABSTRACT

Self crosslinking aqueous polymer dispersions containing hard and soft copolymers containing polymerized units of a conjugated diene, a vinyl aromatic compound, an organic carboxylic acid and/or anhydride, and at least one crosslinker may be included in consolidated nonwoven constructions. The consolidated nonwoven construction is useful as a base material such as a bituminized roofing mat.

20 Claims, No Drawings

SELF-CROSSLINKING AQUEOUS POLYSTYRENE-BUTADIENE DISPERSIONS FOR CONSOLIDATING BITUMINIZABLE NONWOVENS AND ALSO CONSOLIDATED NONWOVENS

This application is a Division of application Ser. No. 09/753,560 Filed on Jan. 4, 2001 which was published in English.

BACKGROUND OF THE INVENTION

1. Field of the Invention

The present invention relates to self-crosslinking aqueous polymer, e.g., polystyrene-butadiene, dispersions for consolidating bituminizable base materials such as, for example, bituminized roofing mats and also to the nonwovens consolidated using these polymer dispersions.

2. Background of the Invention

EP-A-0438 284 describes an aqueous polymer emulsion having a low free-formaldehyde content, which is achieved by using N-methylolacrylamide as formaldehyde scavenger. The compound is used for crosslinking polyvinyl acetate and vinyl acetate-styrene dispersions.

WO 97/32930 describes an aqueous dispersion for coating textiles which is composed of a hydrophilic polyurethane (PU) and a copolymer of styrene, butadiene and further copolymerizable monomers. These PU dispersions are used for coating roofing mats.

DE-A 40 29 733 describes bound nonwovens comprising a binder composed of a dispersion prepared by polymerization of a conjugated diene, and $\alpha,\beta$-unsaturated mono- or dicarboxylic acid and hydroxyl containing olefinic monomers.

U.S. Pat. No. 4,125,663 discloses a process for the production of bound nonwovens using a polymer dispersion comprising melamine/formaldehyde resins as crosslinkers.

Bituminized roofing mats are produced by saturating and/or coating a base material with bitumen. The formerly used base materials composed of cardboard failed to keep pace with increasing performance expectations and have been superseded by raw felt, woven jute fabric, glass mats, mixed glass fiber cloth and especially by polyester spunbondeds and also polyester staple fiber webs. Such nonwovens, consolidated with dispersion binder, for example, have to meet the following performance requirements in bituminization and end use:

Low Extensibility at 160 to 200° C. Under High Tensile Stress, High Mechanical Strength The reinforcing construction of bound nonwoven should extend little if at all under the production conditions of bitumen impregnation and/or coating. 1% extension must not be exceeded at 160 to 200° C. and the high tensile stresses due to the highly viscous bitumen and the high production speeds. A higher extensibility would cause stresses to be frozen into the roofing mat as it cooled down and was wound up, which would become rereleased on renewed heating, for example in the course of the welding of the seams or in the event of strong insolation. This would lead to cracks in the roof membrane. The low-extensibility requirement applies longitudinally, transversely and diagonally.

Good Adhesion to Bitumen

Low Sensitivity to Water, High Watertightness

If the bound nonwovens (fiber material, binder) are not sufficiently hydrophobic, the wicking effect of individual filaments may cause water to ingress at the points of intersection of the roofing mats. This leads to separation between the bitumen and the bound nonwoven or to frost damage.

Flexibility and Extensibility of Construction in End Use

Owing to temperature fluctuations in end use (−40° C. to +80° C.) and differences in the expansion coefficients of various building materials, the entire roofing mat is subject to relatively large dimensional changes. Excessive stiffness and inflexibility of the overall construction gives rise to fine cracks which, combined with moisture and low temperatures, lead to the destruction of the roofing mat. It is therefore urgently necessary that not only the bitumen but also the reinforcement of bound nonwoven remain flexible at the use temperature.

SUMMARY OF THE INVENTION

The present invention is based on the surprising discovery that polymers of aromatic vinyl compounds and conjugated dienes, e.g., styrene-butadienes, copolymerized with compounds having self-crosslinking groups are useful for impregnating nonwovens. The end products obtained have the required dimensional stability at high temperatures and are substantially insensitive to water. Room temperature mechanical properties are similar to those of standard systems.

Accordingly, the present invention provides self-crosslinking aqueous polymer dispersions for consolidating bituminizable nonwovens, composed of the following polymerized monomer units:

1) 20 to 55 parts, based on the dry mass of the disperse phase, of at least one conjugated diene,
2) 30 to 80 parts, based on the dry mass of the disperse phase, of at least one copolymerizable aromatic vinyl compound,
3) 0.1 to 10 parts, based on the dry mass of the disperse phase, of at least one polymerizable organic carboxylic acid and/or anhydride,
4) 1 to 10 parts of at least one crosslinker,
5) 0 to 20 parts, based on the dry mass of the disperse phase, of at least one derivative of an $\alpha,\beta$-unsaturated carboxylic acid.

A more complete appreciation of the invention and many of the attendant advantages thereof will be readily obtained as the same becomes better understood by reference to the following detailed description.

DETAILED DESCRIPTION OF THE INVENTION

A particularly useful component 1) is 1,3-butadiene. Other 1,3-dienes may be used as well, for example isoprene, chloroisoprene or 2,3-dimethylbutadiene. Butadiene is preferred.

The preferred component 2) is styrene. Other aromatic vinyls may likewise be used, for example methylstyrene or styrene carboxylic acids.

Useful copolymerizable organic carboxylic acids (component 3) include, for example, acrylic acid, methacrylic acid or itaconic acid, used alone or mixed. Maleic acid, fumaric acid, maleic anhydride and fumaric anhydride may also be used. Acrylic acid and/or methacrylic acid are preferred.

The crosslinker (component 4) is in principle an acrylamide or a methacrylamide. The following compounds are preferred: N-methylolacrylamide, N-methoxymethylacrylamide,
N-hydroxymethylacrylamide, N-methylolmethacrylamide, N-methoxymethylmethacrylamide and N-hydroxymethylmethacrylamide.

Useful derivatives of α,β-unsaturated carboxylic acids (component 5) include the following compounds: acrylamide, methacrylamide, acrylonitrile and methacrylonitrile.

It is further possible to use the hereinbelow described mixtures of self crosslinking dispersions for consolidating bituminizable nonwovens.

By blending "soft" and "hard" types it is thus possible to freely select different nonwoven application properties, e.g., pliability.

A hard styrene-butadiene rubber (SBR) type, for example, has the following composition: 60% of styrene, 28% of butadiene, 8% of acrylonitrile, 2% of acid, 4% of crosslinker; a soft SBR type, for example, has the following composition: 35% of styrene, 42% of butadiene, 10% of acrylonitrile, 7% of acrylamide, 2% of acid, 4% of crosslinker.

In general, mixing ratios for soft component: hard component are chosen between 7:3 and 0:10.

Preference is given to mixtures between the soft component: hard component mixing ratios of 5:5 to 1:9, particularly 3:7 to 2:8.

The inventive dispersions for consolidating nonwovens may also comprise auxiliary and additive substances, for example anionic emulsifiers, nonionic emulsifiers, aging inhibitors, biocides, defoamers, pH buffers, and complexing agents.

The present invention also provides consolidated nonwovens consolidated using a self-crosslinking aqueous polymer dispersion, composed of the following polymerized monomer units:

1) 20 to 55 parts, based on the dry mass of the disperse phase, of at least one conjugated diene,
2) 30 to 80 parts, based on the dry mass of the disperse phase, of at least one copolymerizable aromatic vinyl compound,
3) 0.1 to 10 parts, based on the dry mass of the disperse phase, of at least one polymerizable organic carboxylic acid and/or anhydride,
4) 1 to 10 parts of at least one crosslinker,
5) 0 to 20 parts, based on the dry mass of the disperse phase, of at least one derivative of an α,β-unsaturated carboxylic acid.

Nonwovens that may be used in the present invention include all known nonwovens, for example nonwovens composed of glass, polymers and natural products and also their hybrid constructions, especially from raw felt, woven jute fabric, glass mat, mixed glass fiber cloth, polyamide and polyester. Spunbonded nonwovens and staple fiber nonwovens are preferred. Polyester spunbondeds and polyester staple fiber webs are particularly preferred. The nonwovens used are readied for this use in a conventional manner, i.e. needled or heat-set. The nonwovens generally have a weight of 20-350 g/m², preferably 100-250 g/m².

The components 1) to 5) and further, auxiliary and additive substances are present as described above.

EXAMPLES

Having generally described this invention, a further understanding can be obtained by reference to certain specific examples which are provided herein for purposes of illustration only and are not intended to be limiting unless otherwise specified.

The examples which follow illustrate the invention:

| Monomer | Inventive Ex. 1 | Inventive Ex. 2 |
|---|---|---|
| 1,3-Butadiene | 32 parts | 40 parts |
| Styrene | 62 parts | 37 parts |
| Acrylonitrile | 0 parts | 10 parts |
| Acrylamide | 2 parts | 7 parts |
| Acid | 2 parts | 2 parts |
| Crosslinker | 2 parts | 4 parts |

The other starting materials important for the emulsion polymerization, e.g. initiators, emulsifiers, molecular weight regulators and aging inhibitors, are used in the production process in the prior art types and amounts. The same applies to the polymerization process used for the production.

Illustrative Production Process

A polymerization tank is charged with completely ion-free water, the customary emulsifiers and auxiliaries and the monomers.

The batch is heated to about 50° C., at which point the free-radical former is added. The temperature is raised (about 90° C.) and the polymerization is completed in the course of 6–8 h. A coagulum-free dispersion is obtained.

The details of the production process are described in Examples 1 to 9 and A to F of DE-A 38 40 512 (Hüls AG), on pages 5 to 7.

The solids content was determined according to DIN 53 189.

The following dispersions were characterized with regard to their application properties:

| Dispersion | Solids content [%] | Viscosity Brookfield [mPas] | pH | Glass transition temperature [° C.] |
|---|---|---|---|---|
| Comparative Ex. 1 standard (styrene-acrylate) | 50 | 100 | 4.5 | 30 |
| Comparative Ex. 2 standard (straight-acrylate) | 50 | 150 | 2.5 | 49 |
| Comparative Ex. 3 (Inv. Ex. 1 without self-crosslinking group) | 50 | <100 | 8.5 | 44 |
| Inventive Ex. 1 (self-crosslinking SBR) | 50 | 90 | 4.5 | 41 |
| Inventive Ex. 2 (self-crosslinking SBR) | 40 | 25 | 8.0 | 25 |

Mixtures of the self-crosslinking SBR types were included in the tests as well. By blending "soft" and "hard" types it is thus possible to freely select different nonwoven application properties (e.g. pliability).

Determination of Dimensional Stability

The determination was carried out according to DIN 18192 (point 5.7). For characterization, a spunbonded web is foam-impregnated on a Mathis pad-mangle (nip: −10) with the following liquor:

| | |
|---|---|
| Aqueous dispersion (50% strength): | 250 g |
| Rohagit SL 215: | 7.5 g |
| | (foaming agent) |

| | |
|---|---|
| Rohagal 10 n: | 1.0 g (foam stabilizer) |
| Completely ion-free water: | 241.5 g |

Prior to impregnation the web is preshrunk at 220° C. for 5 min. After impregnation, it is dried and cured at 180° C. for 10 min. The hereinbelow recited results are averages of three individual determinations in each case.

Rohagit SL 215 is a foaming agent which is commercially available from Röhm GmbH. This material is an aqueous solution of an acrylic polymer.

Rohagal 10 n is a foam stabilizer which is commercially available from Röhm GmbH. This material is a nonionic surfactant based on fatty alcohol polyalkyl ether.

| Dispersion | Binder add-on [%] | Dimensional change MD [%] | Dimensional change XD [%] |
|---|---|---|---|
| Comparative Ex. 1 | 24.5 | 1.25 | 1.0 |
| Comparative Ex. 2 | 24.0 | 1.25 | 1.25 |
| Comparative Ex. 3 | 25.5 | 15 | 17 |
| Inventive Ex. 1 | 24.0 | 1.0 | 1.0 |
| Inventive Ex. 2 | 23.5 | 0.75 | 1.0 |
| Inventive Ex. 3 (1:1 mixture of Inventive Examples 1 and 2) | 24.0 | 1.0 | 1.0 |

The nonwovens produced using the dispersions of the invention exhibit distinctly less shrinkage.

Spunbondeds impregnated with Inventive Example 1 and Inventive Example 2 or a mixture of the two have a dimensional stability which is similar or in some instances superior to that of standard systems. These products comply with the limit values stipulated in the DIN prescription. An SBR without self-crosslinking groups does not provide an acceptable DIN 18192 performance. Such a system cannot be used as a nonwoven.

It is known in the field that addition of melamine-formaldehyde (MF) resins or of similar compounds may improve an inadequate dimensional stability. As the following table shows, this is also possible in the case of Comparative Example 3. However, the stipulated values and the results of Inventive Example 1 or Inventive Example 2 are not achieved, however.

| Dispersion | Binder add-on [%] | Dimensional change MD [%] | Dimensional change XD [%] |
|---|---|---|---|
| Comparative Ex. 3 | 25.5 | 15 | 17 |
| Comparative Ex. 4 (Comparative Ex. 3 + 10% MF (solid on solid)) | 24.0 | 3.0 | 2.5 |

An example of a useful melamine-formaldehyde is Cassurit MT (from Clariant).

Determination of Capillary Rise

To test the sensitivity to water and the capillarity, 3 cm wide strips of the bound and dried nonwovens are dipped vertically into a waterbath, to a depth of one centimeter. The water is then free to rise vertically in the bound nonwoven. The rise over 24 hours is determined in centimeters.

| Dispersion | Binder add-on [%] | Capillary rise [cm] |
|---|---|---|
| Comparative Ex. 1 | 24.5 | <1 |
| Comparative Ex. 2 | 24.0 | <1 |
| Comparative Ex. 3 | 25.5 | 0 |
| Inventive Ex. 1 | 24.0 | <1 |
| Inventive Ex. 2 | 23.5 | <1 |
| Inventive Ex. 3 | 24.0 | 1.0 |

Determination of Breaking Strength of Bound Nonwovens at RT

The test is carried out on the lines of DIN EN ISO 527-1 and DIN EN ISO 527-3. Samples 15 cm long and 5 cm wide are cut out of the bound nonwovens, conditioned for 24 hours at 23° C. and 50% relative humidity and then characterized on an Instron tensile tester.

The test parameters used were as follows:

| | |
|---|---|
| Strain rate: | 100 mm/min |
| Nonwoven thickness: | 2 mm |
| Measuring range: | 0–5000 N |
| Clamped length: | 50 mm |

The results are shown hereinbelow:

| Extension | Comp. Ex. 1 (SA) Force [N] | Inv. Ex. 1 Force [N] | Inv. Ex. 3 Force [N] |
|---|---|---|---|
| 2% | 126 | 165 | 115 |
| 3% | 190 | 230 | 185 |
| 5% | 262 | 310 | 256 |
| 10% | 354 | 398 | 340 |
| 15% | 424 | 458 | 400 |
| Force (max) | 803 | 744 | 701 |
| Extension (max) | 60% | 53% | 58% |

Thermal Stability

Since, as described above, the bound nonwovens are processed in a hot bitumen bath at 200° C., the change in the mechanical properties on exposure to thermal stress is of interest. Since the styrene-butadiene polymers, unlike styrene-acrylates and straight acrylates, still contain reactive double bonds after polymerization which are capable of reacting with a wide range of partners, for example free radicals (atmospheric oxygen), at high temperatures, the changed binder properties after exposure to thermal stress deserves particular attention.

The bound nonwovens were heat-treated at 200° C. for 30 min and then assessed. Compared with the standard styrene-acrylate and straight acrylate systems, the nonwovens which have been finished with SBR are in some cases badly browned. Since, however, the nonwoven is surfaced by two bitumen layers (top and bottom) in end use and thus not directly visible, this purely visual defect is not relevant for the contemplated use segment. A test of the mechanical properties (dimensional stability) after the heat treatment did not produce inferior results.

Obviously, numerous modifications and variations of the present invention are possible in light of the above teachings. It is therefore to be understood that within the scope of the appended claims, the invention may be practiced otherwise than as specifically described herein.

This application is based on German Patent Application Serial No. 10000446-6, filed on Jan. 7, 2000, and incorporated herein by reference in its entirety.

What is claimed is:

1. A consolidated nonwoven consolidated by self-crosslinking an aqueous polymer dispersion comprising a hard polymer and a soft polymer,
wherein the hard polymer comprises polymerized units of
 1) 20 to 32 parts, based on the dry mass of the disperse phase, of at least one conjugated diene,
 2) 62 to 80 parts, based on the dry mass of the disperse phase, of at least one copolymerizable aromatic vinyl compound,
 3) 0.1 to 10 parts, based on the dry mass of the disperse phase, of at least one polymerizable organic carboxylic acid and/or anhydride,
 4) 1 to 10 parts of at least one crosslinker,
 5) 0 to 20 parts, based on the dry mass of the disperse phase, of at least one derivative of an $\alpha,\beta$-unsaturated caboxylic acid, and
wherein the soft polymer comprises polymerized units of
 1) 40 to 55 parts, based on the dry mass of the disperse phase, of at least one conjugated diene,
 2) 20 to 37 parts, based on the dry mass of the disperse phase, of at least one copolymerizable aromatic vinyl compound,
 3) 0.1 to 10 parts, based on the dry mass of the disperse phase, of at least one polymerizable organic carboxylic acid and/or anhydride,
 4) 1 to 10 parts of at least one crosslinker,
 5) 0 to 20 parts, based on the dry mass of the disperse phase, of at least one derivative of an $\alpha,\beta$-unsaturated caboxylic acid.

2. The consolidated nonwoven of claim 1, wherein the conjugated diene of at least one of the hard or soft polymers is at least one selected from the group consisting of 1,3-butadiene, isoprene, chloroisoprene and 2,3-dimethylbutadiene.

3. The consolidated nonwoven of claim 1, wherein the aromatic vinyl compound of at least one of the hard or soft polymers is at least one selected from the group consisting of styrene, methylstyrene and styrene carboxylic acid.

4. The consolidated nonwoven of claim 1, wherein at least one of the hard or soft polymers comprises a carboxylic acid selected from the group consisting of acrylic acid, methacrylic acid, itaconic acid, maleic acid and fumaric acid.

5. The consolidated nonwoven of claim 1, wherein the crosslinker of at least one of the hard or soft polymers is at least one selected from the group consisting of N-methylacrylamide, N-methoxymethyl acrylamide, N-hydroxymethylacrylamide, N-methylolmethacrylamide, N-methoxymethylmethacrylamaide and N-hydroxymethylmethacrylamide.

6. The consolidated nonwoven of claim 1, wherein at least one of the hard or soft polymers comprises an $\alpha,\beta$-unsaturated caboxylic acid selected from the group consisting of acrylamide, methacrylamide, acrylontirile and methacrylonitrile.

7. The consolidated nonwoven of claim 1, wherein the nonwoven comprises at least one selected from the group consisting of glass, polymers, natural products and hybrid constructions thereof.

8. The consolidated nonwoven of claim 7, wherein the nonwoven is at least on of a polyester spunbonded or a polyester staple fiber web.

9. A method of producing the consolidated nonwoven of claim 1, comprising impregnating the nonwoven with said aqueous polymer dispersion followed by curing the polymer.

10. A self-crosslinking aqueous polymer dispersion comprising a hard polymer and a soft polymer, wherein the hard polymer comprises polymerized units of
 1) 20 to 32 parts, based on the dry mass of the disperse phase, of at least one conjugated diene,
 2) 62 to 80 parts, based on the dry mass of the disperse phase, of at least one copolymerizable aromatic vinyl compound,
 3) 0.1 to 10 parts, based on the dry mass of the disperse phase, of at least one polymerizable organic carboxylic acid and/or anhydride,
 4) 1 to 10 parts of at least one crosslinker,
 5) 0 to 20 parts, based on the dry mass of the disperse phase, of at least one derivative of an $\alpha,\beta$-unsaturated caboxylic acid, and
wherein the soft polymer comprises polymerized units of
 1) 40 to 55 parts, based on the dry mass of the disperse phase, of at least one conjugated diene,
 2) 20 to 37 parts, based on the dry mass of the disperse phase, of at least one copolymerizable aromatic vinyl compound,
 3) 0.1 to 10 parts, based on the dry mass of the disperse phase, of at least one polymerizable organic carboxylic acid and/or anhydride,
 4) 1 to 10 parts of at least one crosslinker,
 5) 0 to 20 parts, based on the dry mass of the disperse phase, of at least one derivative of an $\alpha,\beta$-unsaturated carboxylic acid.

11. The dispersion of claim 10, wherein the conjugated diene of at least one of the hard or soft polymers is at least one selected from the group consisting of 1,3-butadiene, isoprene, chloroisoprene and 2,3-dimethylbutadiene.

12. The dispersion of claim 10, wherein the aromatic vinyl compound of at least one of the hard or soft polymers is at last one selected from the group consisting of styrene, methylstyrene and styrene carboxylic acid.

13. The dispersion of claim 10, wherein at least one of the hard or soft polymers comprises a carboxylic acid selected from the group consisting of acrylic acid, methacrylic acid, itaconic acid, maleic acid and fumaric acid.

14. The dispersion of claim 10, wherein the crosslinker of at least one of the hard or soft polymers is at least one selected from the group consisting of N-methylacrylamide, N-methoxymethyl acrylamide, N-hydroxymethylacrylamide, N-methylolmethacrylamide, N-methoxymethylmethacrylamaide and N-hydroxymethylmethacrylamide.

15. The dispersion of claim 10, wherein at least one of the hard or soft polymers comprises an $\alpha,\beta$-unsaturated caboxylic acid selected from the group consisting of acrylamide, methacrylamide, acrylonitrile and methacrylonitrile.

16. The dispersion of claim 10, wherein the conjugated diene of at least one of the hard or soft polymers is at least one selected is 1,3-butadiene and the aromatic vinyl compound of at least one of the hard or soft polymers is styrene.

17. The consolidated nonwoven of claim 1, wherein the weight ratio of the hard polymer to the soft polymer is 1:1.

18. The dispersion of claim 10, wherein the weight ratio of the hard polymer to the soft polymer is 1:1.

19. The consolidated nonwoven of claim 1, wherein the aqueous polymer dispersion comprises a blend of a hard polymer and a soft polymer.

20. The dispersion of claim 10, wherein the hard polymer and the soft polymer are a blend.

* * * * *